(12) United States Patent
Watanabe et al.

(10) Patent No.: US 12,306,445 B2
(45) Date of Patent: May 20, 2025

(54) OPTICAL CONNECTOR AND OPTICAL CONNECTOR CONNECTION STRUCTURE

(71) Applicant: FURUKAWA ELECTRIC CO., LTD., Tokyo (JP)

(72) Inventors: Kengo Watanabe, Tokyo (JP); Mitsuhiro Iwaya, Tokyo (JP); Masayoshi Tsukamoto, Tokyo (JP); Katsuki Suematsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 216 days.

(21) Appl. No.: 17/932,573

(22) Filed: Sep. 15, 2022

(65) Prior Publication Data

US 2023/0011146 A1 Jan. 12, 2023

Related U.S. Application Data

(63) Continuation of application No. PCT/JP2021/012815, filed on Mar. 26, 2021.

(30) Foreign Application Priority Data

Mar. 31, 2020 (JP) .................. 2020-065048

(51) Int. Cl.
*G02B 6/38* (2006.01)

(52) U.S. Cl.
CPC .................. *G02B 6/3853* (2013.01)

(58) Field of Classification Search
CPC ........ G02B 6/32; G02B 6/327; G02B 6/3676; G02B 6/3885

See application file for complete search history.

(56) References Cited

U.S. PATENT DOCUMENTS

| 9,025,917 B2* | 5/2015 | Aoki ............... G02B 6/327 |
| | | 385/74 |
| 2001/0024548 A1 | 9/2001 | Hamanaka et al. |
| 2007/0170348 A1 | 7/2007 | Kito et al. |
| 2015/0277055 A1 | 10/2015 | Bhagavatula et al. |
| 2015/0331204 A1 | 11/2015 | Razdan et al. |

(Continued)

FOREIGN PATENT DOCUMENTS

| JP | 2000218856 A | 8/2000 |
| JP | 2001305376 A | 10/2001 |

(Continued)

OTHER PUBLICATIONS

[English Translation] Written Opinion for International Patent Application No. PCT/JP2021/012815 dated Jun. 8, 2021, pp. all.

(Continued)

*Primary Examiner* — Omar R Rojas
(74) *Attorney, Agent, or Firm* — Dorsey & Whitney LLP

(57) ABSTRACT

The present disclosure relates to an optical connector includes at least one optical fiber; and a lens element including at least one lens that couples light to an end face of the optical fiber. The distance FLh between the end face of the optical fiber and a vertex of the lens is expressed by the sum of the distance FL from the vertex of the lens to the focal point F positioned in a back face direction of the lens and the length δ between the end face of the optical fiber and the focal point F, and the length δ is longer than 10 μm.

10 Claims, 13 Drawing Sheets

(56) References Cited

U.S. PATENT DOCUMENTS

| | | |
|---|---|---|
| 2020/0044411 A1 | 2/2020 | Wakabayashi |
| 2020/0103597 A1 | 4/2020 | Watanabe et al. |
| 2022/0082769 A1* | 3/2022 | Morita ................... H04B 10/25 |

FOREIGN PATENT DOCUMENTS

| | | |
|---|---|---|
| JP | 2003107277 A | 4/2003 |
| JP | 2007164132 A | 6/2007 |
| JP | 2010249877 A | 11/2010 |
| JP | 2020024242 A | 2/2020 |
| WO | 2018221717 A1 | 12/2018 |
| WO | 2021200636 A1 | 10/2021 |

OTHER PUBLICATIONS

International Preliminary Report on Patentability for International Patent Application No. PCT/JP2021/012815 dated Sep. 29, 2022, pp. all.
International Search Report and Written Opinion (English Translation for ISR only) dated Jun. 8, 2021 for International Patent Application No. PCT/JP2021/012815; pp. all.
[English Translation] Notice of Reasons for Refusal for Japanese Patent Application No. 2022-512110, dated Jul. 10, 2024, pp. all.
[English Translation] Office Action mailed Oct. 24, 2024 in JP Application No. 2022-512110; pp. all.

* cited by examiner

OPTICAL CONNECTOR AND OPTICAL CONNECTOR CONNECTION STRUCTURE

CROSS REFERENCE TO RELATED APPLICATIONS

The present application is a continuation application of International Patent Application No. PCT/JP2021/012815 filed on Mar. 26, 2021, which claims the benefit of Japanese Patent Application No. 2020-065048, filed on Mar. 31, 2020. The contents of these applications are incorporated herein by reference in their entirety.

BACKGROUND

Technical Field

The present disclosure relates to optical connectors and optical connector connection structures, and particularly relates to a lens connector that connects optical fibers by a lens method and an optical connector connection structure including the same.

Description of the Related Art

To set up optical wiring including optical fibers in data centers, the demand for optical connectors for back planes (BP) is increasing to cope with increase in the density of optical wiring. The demand for long-distance transmission and large-capacity transmission is also increasing, and hence, for optical connectors for BP, the use of single-mode (SM) optical fibers which can satisfy the requirements for these is increasing. Further, for optical connectors for BP, to cope with increase in scale due to increase in the amount of data communication, use of multicore optical connectors is also being studied.

As methods of connecting optical fibers in optical connectors for BP, physical contact (PC) methods and lens methods are known. In PC methods, optical fibers are physically connected by pushing and physically contacting end faces of optical fibers of optical fiber arrays to be mated to one another by pressing force. However, since optical connectors for BP are used, in general, at places where cleaning is difficult, PC methods have a concern that the communication quality may deteriorate due to dust at optical connection portions. For example, if the optical path is blocked by dust, the insertion loss (the optical power loss) will increase, or if dust gets sandwiched, physical contact may be hindered. In addition, in PC methods, as the number of optical fibers increases, the pressing force per board becomes excessive, and this makes it difficult to increase the number of fibers.

Meanwhile, in recent years, multicore connectors in lens methods have been attracting attention due to the demand for further increasing the number of fibers for an optical connector. In lens methods, an optical connector is provided with a lens array including lenses respectively corresponding to the optical fibers of the optical fiber array, optical connectors provided with lens arrays are fixed to face each other, and thus the optical fibers are optically connected via the lenses. In such lens method, since the beam diameter of the optical fiber is enlarged via the lens, the influence of dust is reduced, and in addition, since the power density at the connection portion is reduced, scorching of the end face of the optical fiber due to dust is also reduced. In addition, since the optical fibers can be connected to one another in a non-contact manner, the pressing force can be constant regardless of the number of optical fibers.

As a connection structure for multicore connectors in such a lens method, for example, Japanese Patent Laid-Open No. 2003-107277 discloses an optical-connector connection structure in which two optical connectors including multicore optical fibers are joined via a lens array for optical connectors, including lenses formed of a transparent resin.

SUMMARY

Meanwhile, optical transmission systems of 100 Gigabit Ethernet (registered trademark) are widely used nowadays, and researches to improve the transmission characteristics such as the transmission distance and the transmission speed are being conducted. In such optical transmission systems, an incoming optical power up to approximately +10.5 dBm is used.

However, if a conventional optical connector connection structure that connects multicore optical fibers by a lens method is used in an optical transmission system using a high power more than +20 dBm such as wavelength-division multiplexing methods, light is slightly absorbed in the resin lens and converted into heat, and the temperature of the resin lens, which is the optical path, increases due to the heat. If the temperature of the resin lens increases, the effective refractive index changes, and a change occurs in the distance from the lens to the ideal focal point. Along with the change in the ideal focal point position, the core of the optical fiber goes out of focus, and this raises a concern about increase in the insertion loss.

The present disclosure is related to providing an optical connector in a lens method whose insertion loss can be reduced even during high power light input.

An optical connector according to a representative embodiment includes: at least one optical fiber; and a lens element including at least one lens that couples light to an end face of the optical fiber, a distance FLh (μm) between an end face of the optical fiber and a vertex of the lens is expressed by a sum of a distance FL (μm) from the vertex of the lens to a focal point F positioned in a back face direction of the lens and a length δ (μm) between the end face of the optical fiber and the focal point F, and the length δ is longer than 10 μm.

With the optical connector according to the present disclosure, it is possible to reduce the insertion loss even during high power light input.

DETAILED DESCRIPTION

1. An Overview of Embodiments

Figure 1:
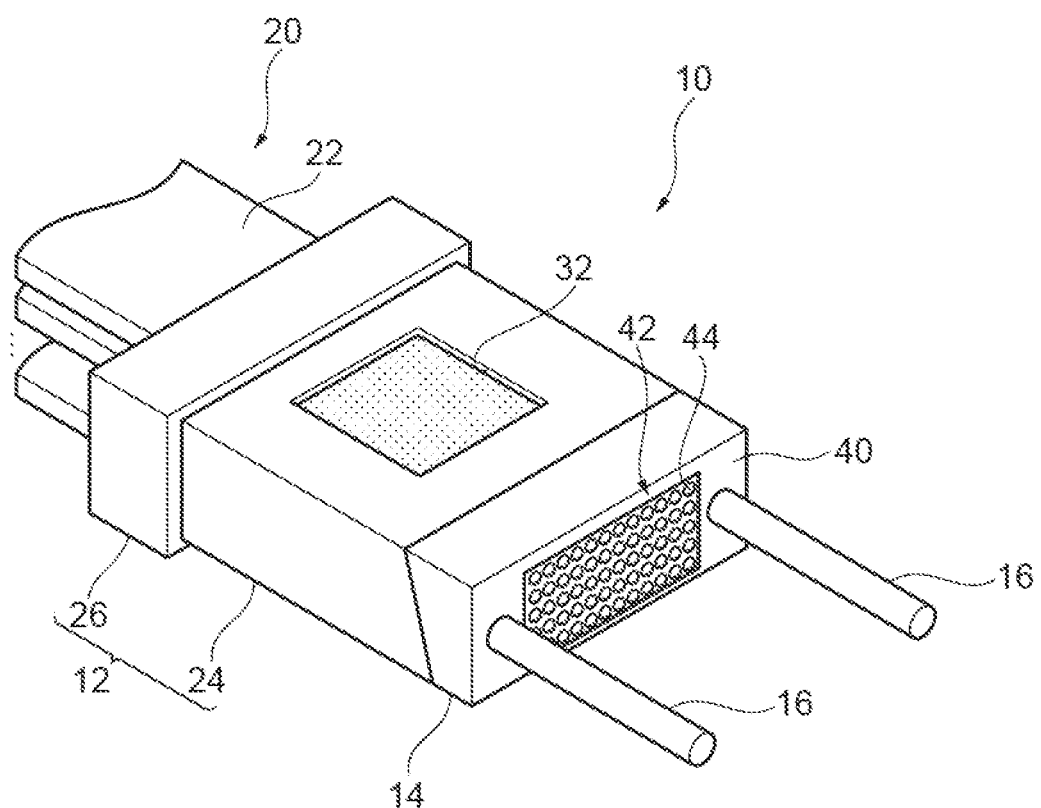
FIG. 1 is a perspective view illustrating the outer appearance of an optical connector according to Embodiment 1.

First, an overview of representative embodiments in the present disclosure will be described. Note that in the following description, as an example, the reference symbols in the drawings corresponding to the constituents of the disclosure are stated with parentheses.

[1] An optical connector according to a representative embodiment of the present disclosure includes: at least one optical fiber; and a lens element including at least one lens that couples light to an end face of the optical fiber, a distance FLh (μm) between an end face of the optical fiber and a vertex of the lens is expressed by a sum of a distance FL (μm) from the vertex of the lens to a focal point F positioned in a back face direction of the lens and a length δ (μm) between the end face of the optical fiber and the focal point, and the length δ is longer than 10 μm.

[2] The above optical connector may have an incoming optical power in which a connection loss during high power light input is smaller than a connection loss during low power light input.

[3] In the above optical connector, the high power may be an incoming optical power of +20 dBm or more.

[4] In the above optical connector, the low power may be an incoming optical power less than +11 dBm.

[5] In the above optical connector, the lens element may include a resin material.

[6] The above optical connector may further include a ferrule holding the optical fiber, and the lens element and the ferrule may include the same resin material.

[7] In the above optical connector, the resin material may be cycloolefin polymer or polyetherimide.

[8] The above optical connector may include a filling medium between the end face of the optical fiber and the lens element, and the filling medium may be an adhesive.

[9] In the above optical connector, the at least one optical fiber may be a plurality of optical fibers, and the at least one lens may be a plurality of lenses (44) corresponding to the optical fibers.

[10] In the above optical connector, the length δ may be longer than 20 μm.

[11] In the above optical connector, the length δ may be 100 μm or less.

[12] In the above optical connector, the optical fiber may be a single-mode fiber.

[13] In an optical connector connection structure, at least one of optical connectors to be mated may include the above optical connector.

2. Specific Examples of Embodiments

Hereinafter, specific examples of embodiments of the present disclosure will be described with reference to the figures. Note that in the following description, common constituents in each embodiment are denoted by the same reference symbols, and repetitive description will be omitted. The drawings are schematic, and thus, the relations between dimensions of the constituents, the ratios of the constituents, and the like may be different from the actual ones. Also, between the drawings, portions in which the relations and ratios between dimensions are different may be included.

Embodiment 1

Figure 2:
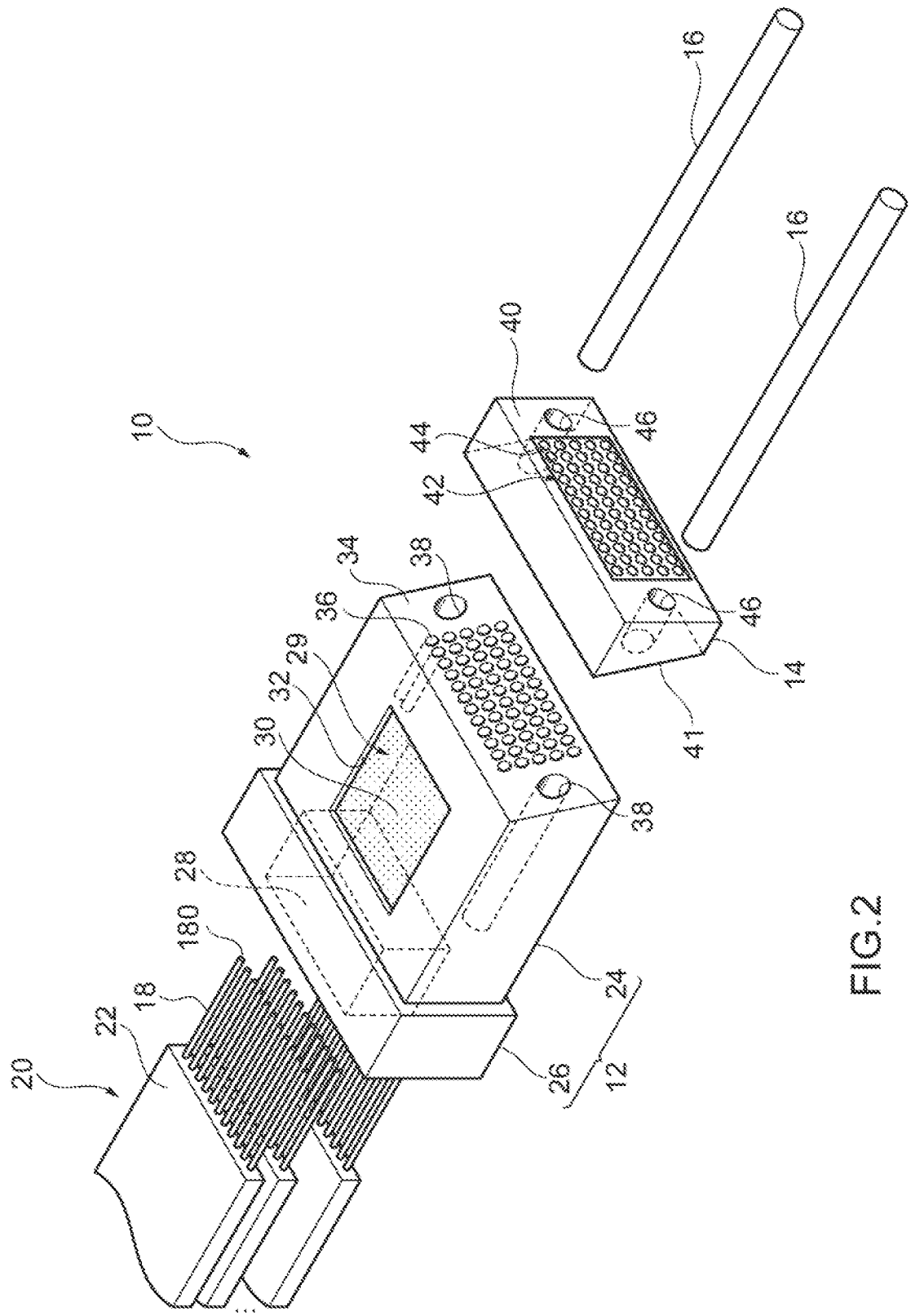
FIG. 2 is an exploded perspective view illustrating the configuration of the optical connector according to Embodiment 1.

FIG. 1 is a perspective view illustrating the outer appearance of an optical connector according to Embodiment 1 of the present disclosure. FIG. 2 is an exploded perspective view illustrating the configuration of the optical connector according to Embodiment 1 of the present disclosure.

As illustrated in FIGS. 1 and 2, the optical connector 10 according to Embodiment 1 is a multicore optical connector for respectively connecting a plurality of optical fibers fixed to the optical connector 10 to a plurality of optical fibers fixed to another optical connector to be connected with. Specifically, the optical connector 10 includes a plurality of optical fibers 18, a ferrule 12, a lens element 14, and a pair of guide pins 16.

Figure 3:
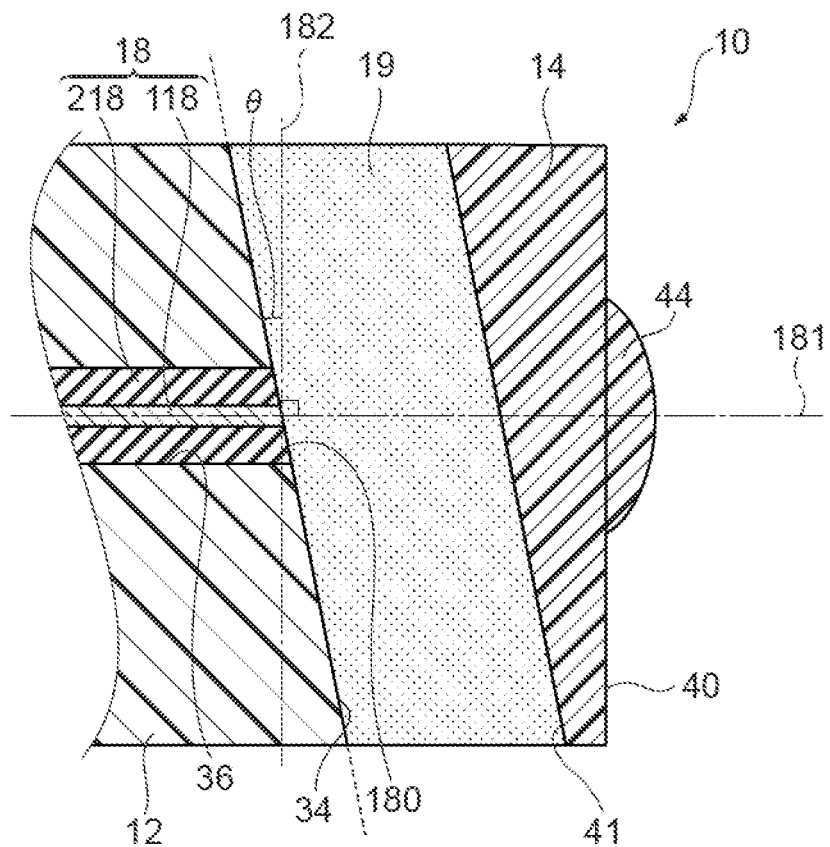
FIG. 3 is a diagram schematically illustrating the joint portion between an optical fiber and a lens element in the optical connector according to Embodiment 1.

As illustrated in FIG. 3, the optical fiber 18 is a quartz-based optical fiber including a core 118 and a clad 218. For example, in the optical connector 10, an optical-fiber-tape core wire 20 including a specified number of optical fibers 18 arranged in parallel and integrally coated with a coat 22 made of a resin such as a UV curable resin is used, and a plurality of the optical-fiber-tape core wires 20 are stacked and fixed to the ferrule 12. The optical fiber 18 is, for example, a single-mode fiber.

The ferrule 12 is a connector body portion holding a plurality of optical fibers 18 arranged in an array in an orderly manner. The ferrule 12 contains a mixture, used in a general resin ferrule, of a base material containing a resin and a filler which is a solid material composed of a material different from the base material. The ferrule 12 is formed by molding the mixture. Note that the method of molding the ferrule 12 is not limited to specific ones, but, for example, transfer molding, injection molding, or the like can be used.

The base material used for the ferrule 12 includes at least one of a thermoplastic resin and a thermosetting resin. As thermoplastic resins used for the base material of the ferrule 12, polyphenylene sulfide (PPS), liquid crystal polymer (LCP), polyether sulfone (PES), polycarbonate (PC), cycloolefin polymer (COP), or the like may be used, for example. As thermosetting resins used for the base material of the ferrule 12, epoxy resin, phenol resin, urea resin, melamine resin, unsaturated polyester resin, or the like may be used, for example.

As a filler used for the ferrule 12, a solid material with a specified shape into which quartz glass or quartz crystals are processed, for example. The filler of the ferrule 12 is contained in the base material to reduce the linear expansion coefficient of the ferrule 12.

As illustrated in FIGS. 1 and 2, the ferrule 12 includes a ferrule body portion 24 and a flange portion 26.

The ferrule body portion 24 is provided on the connection end side of the optical connector 10, and the flange portion 26 is provided on the opposite side to the connection end of the optical connector 10. Note that in the following description, the connection end side of the optical connector 10 is referred to as the "front" of the optical connector 10, and the opposite side to the connection end of the optical connector 10 is referred to as the "rear" of the optical connector 10.

The ferrule 12 is a ferrule for a multicore optical connector. Specifically, the ferrule 12 is a mechanically transferable (MT) ferrule, and, for example, conforms to or complies with standards such as IEC 61754-5 of International Electrotechnical Commission and JIS C 5981 of Japanese Industrial Standards.

An optical-fiber introduction opening 28 to introduce a plurality of optical fibers 18 into the ferrule 12 is formed in the flange portion 26. The optical-fiber introduction opening 28 is formed in the flange portion 26 so as to pass through the flange portion 26 in the front-rear direction of the optical connector 10.

A hollow portion 30 connecting to the optical-fiber introduction opening 28 of the flange portion 26 is formed in the ferrule body portion 24. An opening 32 connecting to the hollow portion 30 is formed in the upper face of the ferrule body portion 24. The opening 32 is a hole to introduce an adhesive 29 to fix the optical fibers 18 to the ferrule 12.

The ferrule body portion 24 has a connection-side end face 34 on the front side of the optical connector 10. The connection-side end face 34 is inclined with respect to the plane perpendicular to the front-rear direction of the optical connector 10. A plurality of optical-fiber insertion holes 36 into which the plurality of optical fibers 18 are inserted along the optical axes of the optical fibers are formed in the connection-side end face 34 of the ferrule body portion 24. The plurality of optical-fiber insertion holes 36 are each formed along the front-rear direction of the optical connector 10. One end of each of the optical-fiber insertion holes 36 is open at the connection-side end face 34. Another end of each of the optical-fiber insertion holes 36 is open so as to connect to the hollow portion 30.

The plurality of optical-fiber insertion holes 36 are arranged in an array. For example, a plurality of rows of optical-fiber insertion holes 36, each row including a specified number of optical-fiber insertion holes 36 lined in parallel along the width direction of the optical connector 10, are formed in tiers in parallel in the up-down direction of the optical connector 10. In FIG. 2, as an example, a case in which five rows of twelve optical-fiber insertion holes 36 are formed is shown. Note that the fashion of the arrangement of the plurality of optical-fiber insertion holes 36, the total number of the plurality of optical-fiber insertion holes 36, the number of optical-fiber insertion holes 36 per row, and the number of tiers of the rows of optical-fiber insertion holes 36 may be set as appropriate depending on the number of optical fibers 18 or other factors. The hole diameter and the pitch of the optical-fiber insertion holes 36 may also be set as appropriate depending on the outer diameter and the pitch of the optical fibers 18. The number of tiers of the optical-fiber insertion holes 36 does not have to be plural but may be one.

Note that each optical fiber 18 has an outer diameter (the outer diameter of the glass portion including the core and the clad) of 80 to 126 µm. For the optical connector 10, in the case in which the outer diameter of the optical fiber 18 is 80 µm, the pitch is, for example, 125 µm or 250 µm, and in the case in which the outer diameter of the optical fiber 18 is 125 µm, the pitch is, for example, 250 µm. Note that the pitch is not limited to these examples, the pitch only needs to be set to be larger than or equal to the outer diameter of the optical fiber 18.

In the ferrule 12 formed as described above, the front end portions of a plurality of optical-fiber-tape core wires 20 are introduced through the optical-fiber introduction opening 28 of the flange portion 26 into the hollow portion 30 of the ferrule body portion 24. The plurality of optical-fiber-tape core wires 20 are stacked in the up-down direction of the optical connector 10. The plurality of optical-fiber-tape core wires 20 may be covered with a boot or the like and held at the rear end of the optical connector 10 to be protected. The coat 22 is removed at the front end portion of each of the optical-fiber-tape core wires 20 introduced in the hollow portion 30, and the end faces 180 of the optical fibers 18 are exposed.

An optical fiber 18 is inserted and fixed in each of the optical-fiber insertion holes 36 formed in the ferrule body portion 24. A plurality of optical fibers 18 inserted and fixed in the plurality of optical-fiber insertion holes 36 in the same row are ones included in the same optical-fiber-tape core wire 20.

The optical fibers 18 are attached and fixed to the optical-fiber insertion holes 36 with the adhesive 29 introduced through the opening 32 in the upper face of the ferrule body portion 24. The end portions of the plurality of optical-fiber-tape core wires 20 introduced in the hollow portion 30 are also attached and fixed to the ferrule body portion 24 with the adhesive 29 introduced through the opening 32.

The optical fibers 18 inserted and fixed in the optical-fiber insertion holes 36 may be in the state of being covered with a resin coat or in the state in which a resin coat is removed.

The end faces of the optical fibers 18 fixed to the optical-fiber insertion holes 36 are polished together with the connection-side end face 34 of the ferrule body portion 24 to be flush with the connection-side end face 34.

As described above, the ferrule 12 holds a plurality of optical fibers 18 such that the plurality of optical fibers 18 are arranged in an array. The ferrule 12 holding a plurality of optical fibers 18 has a fiber array including the plurality of optical fibers 18.

In the width direction of the optical connector 10, at both-side end portions on both sides of the plurality of optical-fiber insertion holes 36 and the hollow portion 30 of the ferrule body portion 24 are formed a pair of guide-pin insertion holes 38 into each of which the guide pin 16 is inserted. Each of the pair of guide-pin insertion holes 38 is formed along the front-rear direction of the optical connector 10.

The lens element 14 is attached to the connection-side end face 34 of the ferrule body portion 24. The lens element 14 is a lens array including a plurality of lenses 44 corresponding to the plurality of optical fibers 18 held by the ferrule 12.

It is preferable that the lens element 14 includes a resin material having a refractive index of 1.40 to 1.67. Forming the lens element 14 using a resin material makes it possible to improve the processability and the mass productivity. By using resin materials having characteristics, for example, linear expansion coefficients, dose to or the same as each other to form the lens element 14 and the ferrule 12, it is possible to reduce the coupling loss of the optical connector. The lenses 44 may include a resin material similar to that of the lens element 14, and the lens element 14 may be formed integrally with the lenses 44.

Such a resin material only needs to be a material capable of transmitting the light to be transmitted, and it is preferable that the resin material is transparent. Examples of the resin material include cycloolefin polymer (COP: the refractive index n=1.51), polyetherimide (PEI: the refractive index n=1.66), polycarbonate (PC: the refractive index n=1.58), polyether sulfone (PES: the refractive index n=1.63), polymethylmethacrylate (PMMA: the refractive index n=1.49), and silicone-based resins (the refractive index n=1.40 to 1.50). The resin material may contain a filler. Since the lens element 14 is a resin plate, the molding is easy, and the mass production is more feasible than in the case of glass. In addition, in the case in which the lens element 14 and the lenses 44 are formed of the same resin material, it is possible to prevent a change in the refractive index that would occur between different kinds of materials.

The lens element 14 has a lens-array-side end face 40 serving as a first main face at which a lens array portion 42 including the plurality of lenses 44 corresponding to the plurality of optical fibers 18 is formed and a lens-array back face 41 serving as a second main surface opposed to the lens-array-side end face 40.

The lens-array-side end face 40 is the face of the lens element 14 that is on the front side of the optical connector 10 and is placed, when two optical connectors 10 are connected, so as to face the other optical connectors 10 to be connected with. More specifically, the lens-array-side end face 40 is placed so as to face the lens-array-side end face 40 of the lens element 14 of the other optical connector 10 to be connected with.

The plurality of lenses 44 arranged in an array so as to correspond to the plurality of optical fibers 18 arranged at the connection-side end face 34 of the ferrule body portion 24 are formed in the lens array portion 42.

Each of the lenses 44 has a convex curved surface on the lens-array-side end face 40 and is formed such that the direction along the front-rear direction of the optical connector 10 agrees with the optical axis. Note that each lens 44 may be a spherical lens or an aspherical lens.

The lens-array back face 41 is the face of the lens element 14 that is on the rear side of the optical connector 10 and that is joined to the connection-side end face 34 of the ferrule 12 with the adhesive 29. Specifically, the lens-array back face 41 is, as described later, a face inclined with respect to the plane perpendicular to the front-rear direction of the optical connector 10 and is joined to the connection-side end face 34 of the ferrule body portion 24 such that each lens 44 is optically coupled to the corresponding optical fiber 18. Note that details of the joint portion between the lens element 14 and the optical fibers 18 will be described later.

Since the lens-array back face 41 is joined to the connection-side end face 34 of the ferrule 12 as described above, the plurality of lenses 44 can function as collimating lenses each of which collimates the light emitted from the corresponding optical fiber 18 toward the lens 44 into parallel light and emits the parallel light toward the mated optical connector. The plurality of lenses 44 can also function as condensing lenses each of which condenses the parallel light incident toward the lens 44 from the mated optical connector on the end face of the corresponding optical fiber 18 to make the light enter the optical fiber 18.

In the width direction of the optical connector 10, a pair of guide-pin insertion holes 46 into each of which the guide pin 16 is inserted are formed in both-side end portions on both sides of the lens array portion 42 of the lens element 14. Each of the pair of guide-pin insertion holes 46 is formed along the front-rear direction of the optical connector 10. The pair of guide-pin insertion holes 46 are formed to correspond to the pair of guide-pin insertion holes 38 of the ferrule body portion 24.

The lens element 14 is attached and fixed to the connection-side end face 34 of the ferrule 12 with the adhesive 29 so as to be positioned by the pair of guide pins 16, in other words, positioned relative to the ferrule 12. The guide pins 16 inserted in the guide-pin insertion holes 46 and 38 have portions protruding forward of the optical connector 10 from the lens element 14 so that the portions can be inserted for connection into the optical connector to be connected with in a similar way.

With the configuration described above, an optical connector 10 including a plurality of optical fibers 18 held by and fixed to the ferrule 12 can be built.

Next, the joint portion between the lens element 14 and the optical fibers 18 will be described in detail.

FIG. 3 is a diagram schematically illustrating the joint portion between an optical fiber 18 and the lens element 14 in the optical connector 10 according to Embodiment 1. In FIG. 3, as an example of an optical connector 10 for connecting multicore optical fibers of a single-mode by a lens method, one optical fiber 18 of the plurality of optical fibers 18 fixed to the ferrule 12 is representatively illustrated.

As illustrated in FIG. 3, the lens-array back face 41 is joined to the connection-side end face 34 of the ferrule 12 (the ferrule body portion 24) and the end face 180 of the optical fiber 18 via an adhesive 19 serving as a filling medium.

Depending on the resin material used for the lens element 14, a material having an optimum refractive index is used for the adhesive 19. It is preferable that the refractive index of the material used for the adhesive 19 has a value between the refractive index of the optical fiber 18 (the core 118) and the refractive index of the resin material used for the lens element 14. It is also preferable that the adhesive 19 is a material that, after curing, becomes transparent to the light in the wavelength band to be transmitted. For such an adhesive 19, for example, an epoxy resin-based adhesive, an acrylic resin-based adhesive, or a silicone-based adhesive may be used.

As illustrated in FIG. 3, the joint surface between the optical fiber 18 and the lens element 14 is not perpendicular to the optical axis 181 of each optical fiber 18. Specifically, the joint surface between the optical fiber 18 and the lens element 14 is inclined with respect to the plane 182 perpendicular to the optical axis 181 of the optical fiber 18.

Here, the joint surface between the optical fiber 18 and the lens element 14 means the end face 180 of the optical fiber 18 and the lens-array back face 41 joined to each other via the adhesive 19.

In other words, the end face 180 of the optical fiber 18 is inclined with respect to the plane 182 perpendicular to the optical axis 181 of the optical fiber 18, and the lens-array back face 41 is inclined with respect to the plane 182. Here, the inclination angle of the end face 180 of the optical fiber 18 with respect to the plane 182 is equal to the inclination angle of the lens-array back face 41 with respect to the plane 182.

In the case in which the inclination angle of the end face 180 of the optical fiber 18 with respect to the plane 182 (the inclination angle of the lens-array back face 41 with respect to the plane 182) is θ [degrees (°)], θ is 0°<θ<90°, preferably θ≥3°, and more preferably θ=approximately 8°.

As a specific example, in order to make the ratio at which the reflection light at the joint surface between the lens element 14 and the optical fiber 18 is coupled to the optical fiber 18, in other words, the reflection attenuation amount at the joint surface between the lens element 14 and the optical fiber 18 smaller than or equal to −45 dB, it is preferable that θ≥3° in the case in which the lens element 14 is formed of COP (the refractive index n=1.51), or it is preferable that θ≥6° in the case in which the lens element 14 is formed of PEI (the refractive index n=1.66). Regardless of the material of the lens element 14, θ may be set to approximately 8°.

Note that in the optical connector 10 according to Embodiment 1, in the case in which the lens 44 has an anti-reflective (AR) coating, the reflection attenuation amount can be −45 dB or less. Depending on the application, it is preferable that the wavelength bandwidths corresponding to the optical communication wavelength bands from the O band to the L band (from 1260 nm to 1625 nm) are used for the optical connector 10. For example, for the optical fiber 18 in the single-mode, the wavelengths of the wavelength bandwidths of O band (1260 nm to 1360 nm), C band (1530 nm to 1565 nm), and L band (1565 nm to 1625 nm) are used.

Next, a method of joining the optical fiber 18 and the lens element 14 in the optical connector 10 according to Embodiment 1 will be described. Here, two methods will be described as examples of methods of joining the optical fiber 18 and the lens element 14.

Figure 4A:
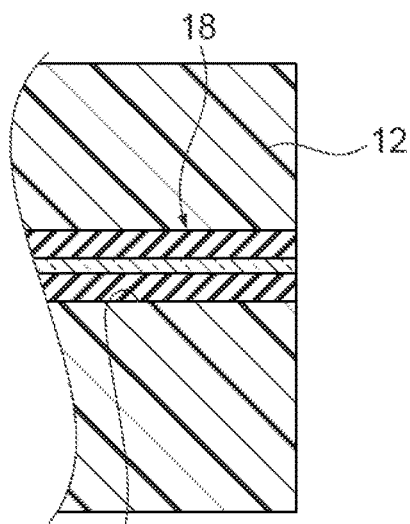
FIG. 4A is a diagram illustrating an example of a method of joining an optical fiber and the lens element in the optical connector according to Embodiment 1.
Figure 4B:
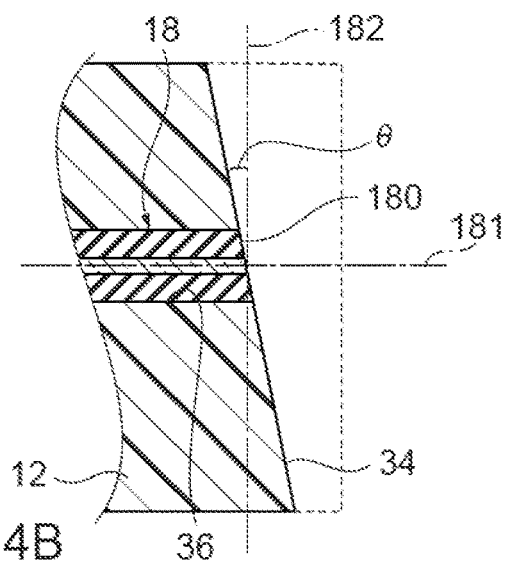
FIG. 4B is a diagram illustrating the example of the method of joining the optical fiber and the lens element in the optical connector according to Embodiment 1.
Figure 4C:
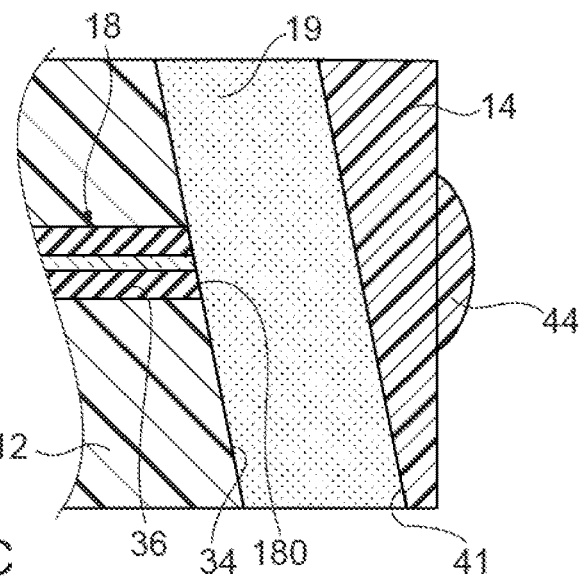
FIG. 4C is a diagram illustrating the example of the method of joining the optical fiber and the lens element in the optical connector according to Embodiment 1.

FIGS. 4A to 4C are diagrams illustrating an example of a method of joining the optical fiber 18 and the lens element 14 in the optical connector 10 according to Embodiment 1.

First, as illustrated in FIG. 4A, a ferrule 12 in which the plurality of optical-fiber insertion holes 36 are formed is prepared, and an optical fiber 18 is inserted into each optical-fiber insertion hole 36 of the ferrule 12 and fixed (step S11). For example, in the state in which an optical fiber 18 is inserted in each optical-fiber insertion hole 36, the adhesive 19 is put into the gap between each optical-fiber insertion hole 36 and the optical fiber 18 to fix the optical fiber 18.

Next, as illustrated in FIG. 4B, the one end face of the ferrule 12 in which the optical fibers 18 are fixed is polished (step S12). Specifically, the ferrule 12 is polished by using a publicly known technique such that the connection-side end face 34 of the ferrule 12 will become non-perpendicular to the optical axis 181 of the optical fiber 18. In this process, the inclination angle 9 of the connection-side end face 34 of the ferrule 12 with respect to the plane 182 perpendicular to the optical axis 181 of the optical fiber 18 is set to an appropriate value, as described above, according to the material of which the lens element 14 is formed.

Next, as illustrated in FIG. 4C, a lens element 14 having a lens-array back face 41 obliquely polished in a way similar to that for the ferrule 12 is prepared, and the lens-array back face 41 of the lens element 14 and the connection-side end face 34 of the ferrule 12 are joined with an adhesive 19 (step S13). In this process, the ferrule 12 and the lens element 14 are joined such that the end face 180 of each optical fiber 18 attached and fixed to the ferrule 12 will face the corresponding lens 44.

With the process steps described above, it is possible to build the joint portion between the optical fibers 18 and the lens element 14 in the optical connector 10 according to Embodiment 1.

FIGS. 5A to 5D are diagrams illustrating another example of a method of joining the optical fiber 18 and the lens element 14 in the optical connector 10 according to Embodiment 1.

Figure 5A:
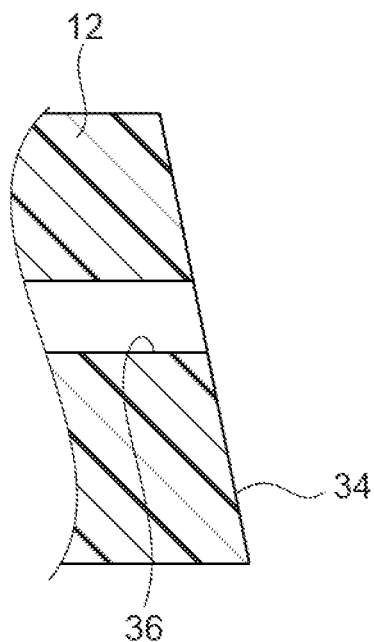
FIG. 5A is a diagram illustrating another example of a method of joining an optical fiber and the lens element in the optical connector according to Embodiment 1.

First, as illustrated in FIG. 5A, a ferrule 12 in which the plurality of optical-fiber insertion holes 36 are formed is prepared, and one end face of the ferrule 12 is polished by a publicly known polishing technique (step S21). The polishing method is similar to the one in the foregoing step S12.

Figure 5B:
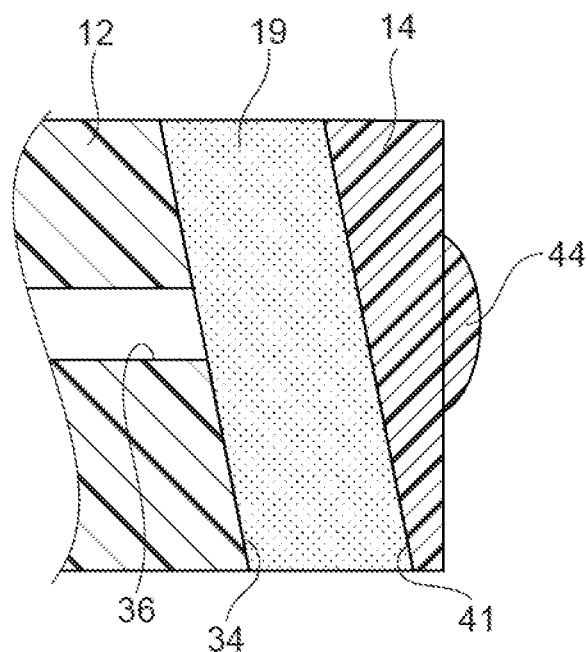
FIG. 5B is a diagram illustrating another example of the method of joining the optical fiber and the lens element in the optical connector according to Embodiment 1.

Next, as illustrated in FIG. 5B, a lens element 14 having a lens-array back face 41 obliquely polished in a similar way to that for the ferrule 12 is prepared, and the lens-array back face 41 of the lens element 14 and the connection-side end face 34 of the ferrule 12 are joined with an adhesive 19 (step S22). In this process, the ferrule 12 and the lens element 14 are joined such that the optical-fiber insertion holes 36 of the ferrule 12 will face the corresponding lenses 44.

Figure 5C:
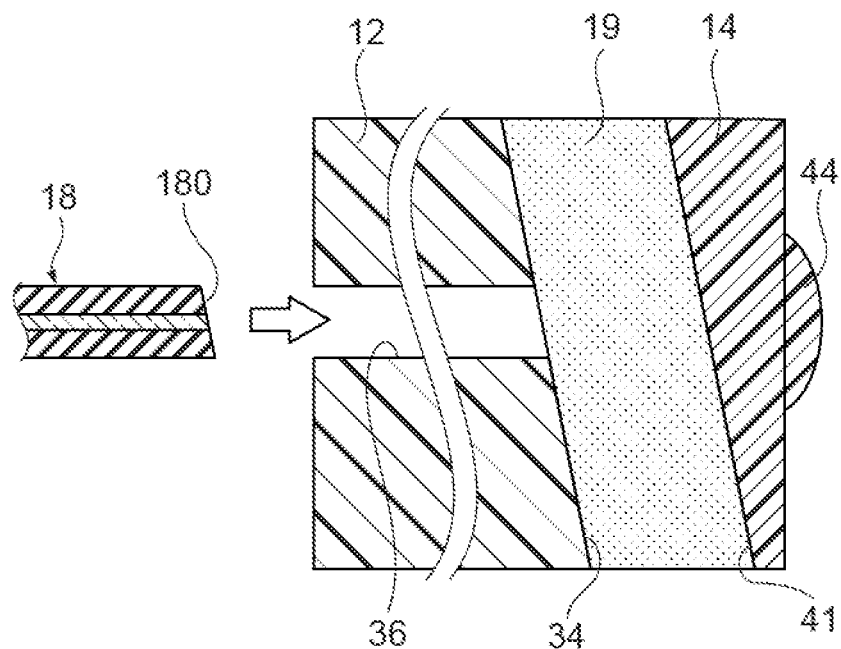
FIG. 5C is a diagram illustrating another example of the method of joining the optical fiber and the lens element in the optical connector according to Embodiment 1.

Next, as illustrated in FIG. 5C, a plurality of optical fibers 18 having end faces 180 on one side, obliquely polished in a way similar to that for the ferrule 12 are prepared, and each of those optical fibers 18 is inserted into the corresponding one of the optical-fiber insertion holes 36 of the ferrule 12 (step S23).

Figure 5D:
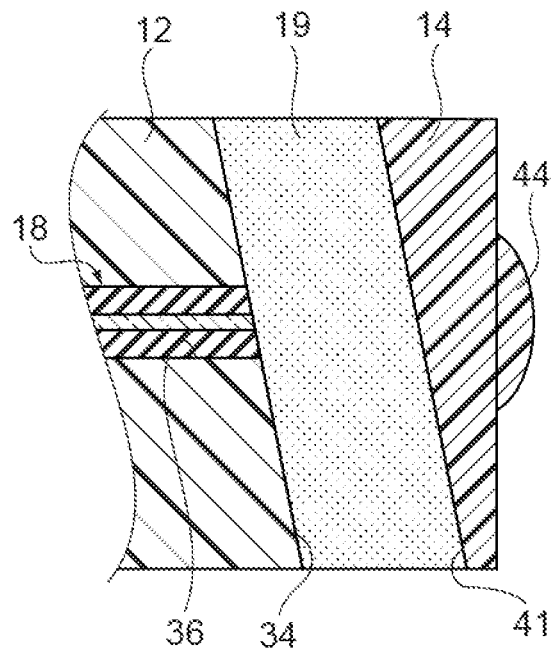
FIG. 5D is a diagram illustrating another example of the method of joining the optical fiber and the lens element in the optical connector according to Embodiment 1.

Next, as illustrated in FIG. 5D, each optical fiber 18 is attached and fixed to the lens-array back face 41 of the lens element 14 via the adhesive 19 (step S24).

With the process steps described above, it is possible to build the joint portion between the optical fibers 18 and the lens element 14 in the optical connector 10 according to Embodiment 1.

Figure 6:
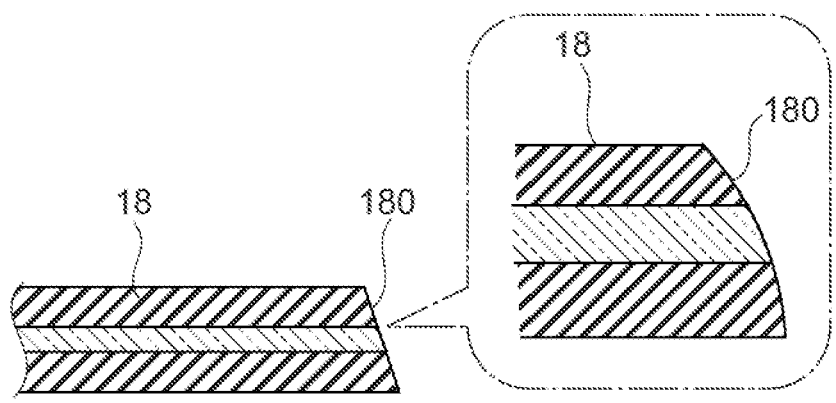
FIG. 6 is a diagram illustrating another example of an optical fiber used in the joining method illustrated in FIGS. 5A to 5D.

In the latter joining method described above (FIGS. 5A to 5D), optical fibers 18 having ends on one side, cut by melting, using, for example, a laser cleaver (or a laser cutter) may be used as illustrated in FIG. 6. The cut face (end face 180) of the optical fiber 18 has a rounded shape because of the heat when melted. Note that the laser in the above laser cleaver is, in general, a laser having an absorption wavelength of optical fibers such as a $CO_2$ laser or an ultraviolet laser. Here, the end face 180 of the optical fiber 18 is a face that contacts the center of the core 118.

Next, an approach to reducing the insertion loss in the optical connector 10 at the time of high power light input will be described in detail.

Figure 7:
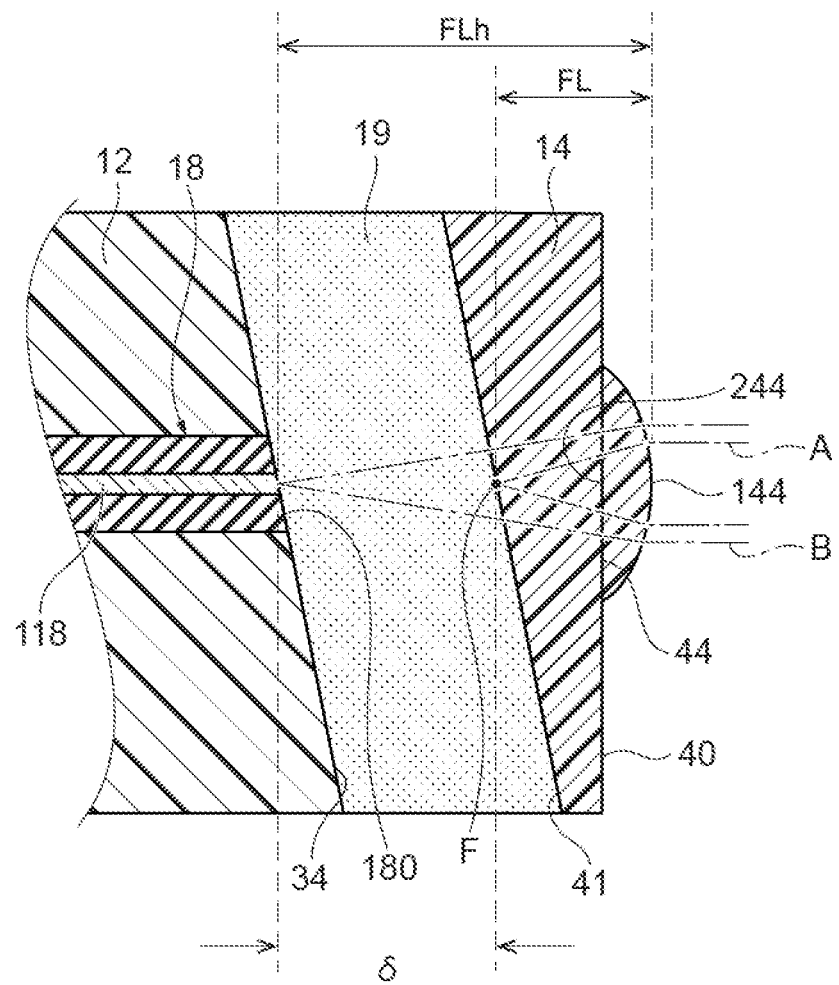
FIG. 7 is a diagram schematically illustrating the relation among a distance FLh, a distance FL, and a length δ in the optical connector according to Embodiment 1.

FIG. 7 is a diagram schematically illustrating the relation among the distance FLh between the end face of the optical fiber 18 and the vertex of the lens 44, the distance FL from the vertex of the lens 44 to the focal point F positioned in the back face direction of the lens 44, and the length δ between the end face of the optical fiber 18 and the focal point F, in the optical connector 10 according to Embodiment 1. In FIG. 7, as in FIG. 3, as an example of an optical connector 10 for connecting multicore optical fibers of a single-mode by a lens method, one optical fiber 18 of the plurality of optical fibers 18 fixed to the ferrule 12 is representatively illustrated.

As illustrated in FIG. 7, the lens-array back face 41, as in FIG. 3, is joined to the end face 180 of the optical fiber 18 via the adhesive 19, and the end face 180 of the optical fiber 18 and the lens-array back face 41 are inclined at the same inclination angle.

The distance FLh between the end face 180 of the optical fiber 18 and the vertex 144 of the lens is expressed by the sum of the distance FL from the vertex 144 of the lens to the focal point F positioned on the back face 244 side of the lens and the length δ between the end face 180 of the optical fiber 18 and the focal point F. The position of the focal point F is the focal point position of the light entering through the vertex 144 of the lens for the case in which optical power is incident to the extent that change in the refractive indexes of the lens element 14 and the lens 44 hardly occurs, in other words, the focal point position at the time of low power light input. Hereinafter, the position of the focal point F is referred to as the ideal focal point position F. Note that low power means an incoming optical power less than +11 dBm which has conventionally been used.

The light incident through the vertex 144 of the lens at the time of low power light input is refracted via the lens 44 as indicated by the optical path A, further passes through the lens element 14, and reaches the ideal focal point position F. The distance from the vertex 144 of the lens to the ideal focal point position F as above is defined as the distance FL (μm). The focal point F is positioned at the joint surface between the adhesive 19 and the lens element 14, in other words, at the lens-array back face 41. Hence, to reduce the transmission loss of light incident at the time of low power light input, it is preferable that the end face 180 of the optical fiber 18 is placed as close to the lens-array back face 41 as possible.

At the time of high power light input, the light incident through the vertex 144 of the lens is refracted via the lens 44 as indicated by the optical path B, further passes through the lens element 14 and the adhesive 19, and reaches the end face 180 of the optical fiber 18. Specifically, the focal point at the time of high power light input is adjusted so as to be positioned at the end face 180 of the optical fiber 18. In other words, the focal point at the time of high power light input is shifted by the length δ from the ideal focal point position F such that the focal point is positioned at the end face 180 of the optical fiber 18 at the time of high power light input. The distance from the vertex 144 of the lens to the focal point position at the time of high power light input, as above, is defined as the distance FLh (μm). Note that high power means an incoming optical power of +20 dBm or more, and the upper limit value is not limited to any specific value, but as a practically feasible incoming optical power, high power may be, for example, +30 dBm or less.

The length δ is the distance (length) between the ideal focal point position F and the focal point position at the time of high power light input and is set longer than 10 μm. Since the length δ is longer than 10 μm, it is possible to reduce the insertion loss, and it is more preferable that the length δ is longer than 20 μm. As described above, the distance FLh is adjusted such that the focal point at the time of high power light input can be at the position shifted by the length δ, which is longer than 10 μm, from the ideal focal point position F toward the end face 180 of the optical fiber 18, in other words, such that the focal point at the time of high power light input can reach the core 118 of the optical fiber 18. The upper limit value of the length δ is not limited to any specific value, and it only needs to be 100 μm or less.

Figure 8:
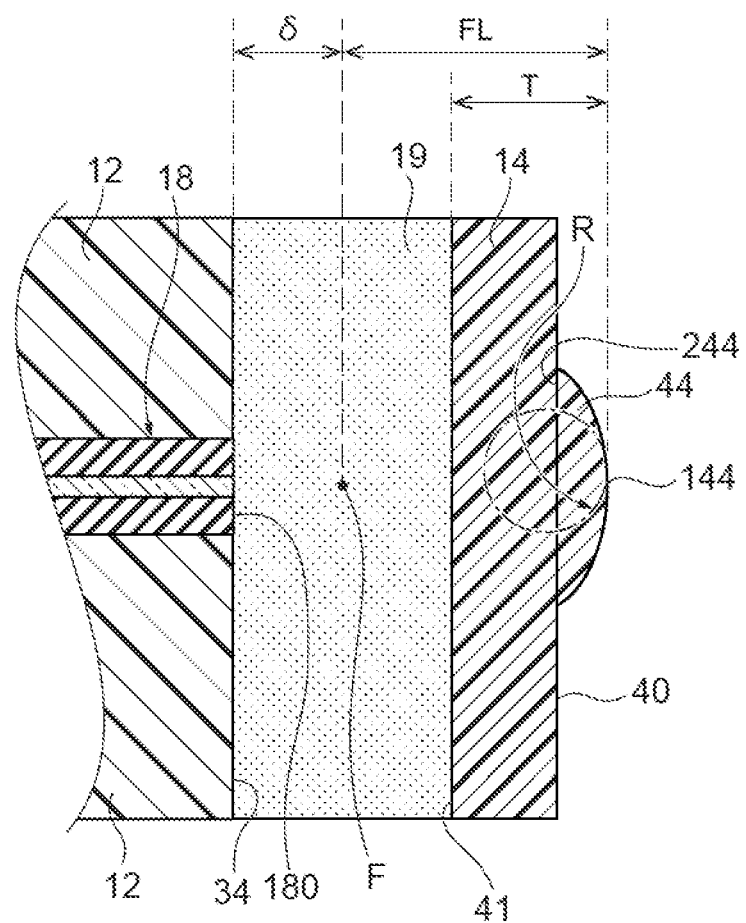
FIG. 8 is a schematic diagram for explaining an equation for calculating the distance FL.

FIG. 8 is a schematic diagram for explaining an equation for calculating the distance FL. The distance FL can be calculated with the following equation (1), which is based on a formula of lenses. Since the distance FL is calculated with the following equation (1), the ideal focal point position F can be determined. Thus, from the foregoing relation between the ideal focal point position F and the length δ, the focal point position at the time of high power light input can be adjusted. Note that although in FIG. 8, the end face 180 of the optical fiber 18 and the lens-array back face 41 are shown so as not to be inclined for convenience of explanation, even if these are inclined, the distance FL can be calculated with the following equation (1) in a similar way.

$$FL = \frac{n_1 \times R}{n_L - 1} - \frac{n_1 \times T}{n_L} + T \quad (1)$$

FL: the distance from the lens vertex to the ideal focal point position
T: the distance from the lens vertex to the lens element
R: the radius of curvature near the center axis of the lens surface (in the case of an aspherical lens, r in the aspherical equation expressed by the following equation (2))
$n_L$: the refractive index of the lens medium
$n_1$: the refractive index of the filling medium (an adhesive or the like) (1 in the case of air)

$$z = \frac{\frac{h^2}{r}}{1 + \sqrt{1 - \frac{(q+k)h^2}{r^2}}} + Ah^4 + Bh^6 + Ch^8 + \ldots \quad (2)$$

r: the radius of curvature
h: the distance from the optical axis (in the radial direction)
k: the conic constant
z: the sag amount (in the direction parallel to the optical axis of the lens)
A, B, C, . . . : the aspheric coefficient Next, the insertion loss of the optical connector 10 at the time of high power light input will be described using specific examples.

Figure 11:
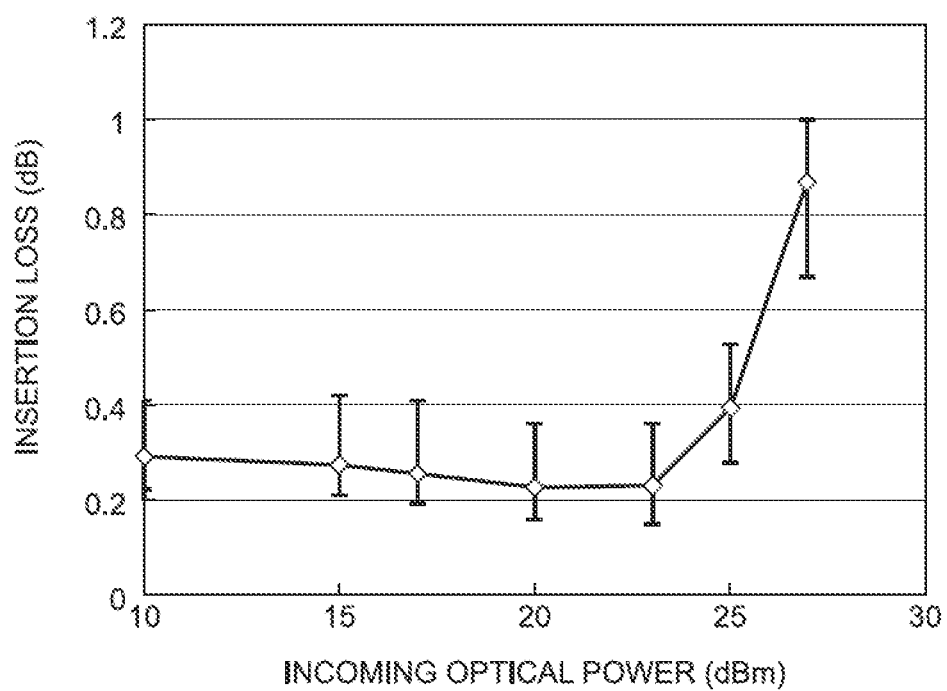
FIG. 11 is a diagram illustrating the relation between the incoming optical power and the insertion loss in the case of δ=approximately 23 in the optical connector according to Embodiment 1.

FIG. 11 is a diagram illustrating the relation between the incoming optical power and the insertion loss in the case of δ=approximately 23 in the optical connector 10 according to Embodiment 1. As illustrated in FIG. 11, in the case of δ=approximately 23, the insertion loss is minimized when the incoming optical power is in the range of +20 to +23 dBm. Note that in FIG. 11, the value calculated as the average value of 48 measurement results is plotted, and the straight lines extending upward and downward from each plotted point show the range of the maximum value and the minimum value in the all measurement results.

Figure 12:
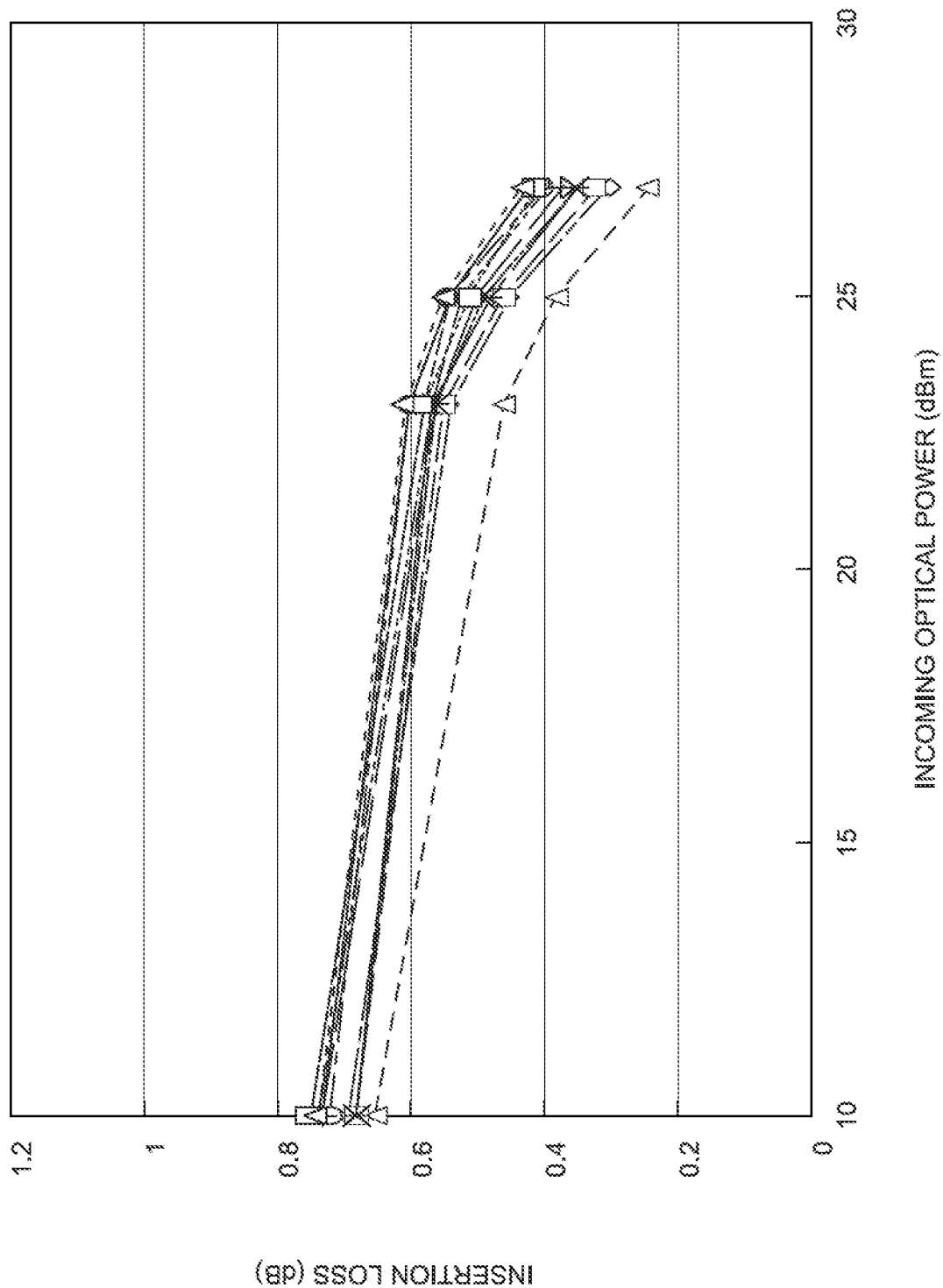
FIG. 12 is a diagram illustrating the relation between the incoming optical power and the insertion loss in the case of δ=approximately 33 in the optical connector according to Embodiment 1.

FIG. 12 is a diagram illustrating the relation between the incoming optical power and the insertion loss in the case of δ=approximately 33 in the optical connector 10 according to Embodiment 1. As illustrated in FIG. 12, in the case of δ=approximately 33, the insertion loss is reduced even over +25 dBm of the incoming optical power, and it is expected that the insertion loss will be minimized at +27 dBm or more. In other words, the optical connector 10 according to Embodiment 1 may have an incoming optical power in which the connection loss at the time of high power light input is smaller than the connection loss at the time of low power light input. Note that FIG. 12 shows twelve measurement results at each point.

As described above, in the optical connector 10 according to Embodiment 1, the distance FLh is adjusted such that the focal point at the time of high power light input will be at the position shifted from the ideal focal point position F by the length δ, which is longer than 10 μm, toward the end face 180 of the optical fiber 18. In other words, the distance FLh is adjusted so as to be longer than the distance FL from the vertex 144 of the lens to the ideal focal point position F by 10 μm or more. Since the focal point at the time of high power light input is positioned at the end face 180 of the optical fiber 18 (the core 118), even if the lens element 14 and the lens 44 are formed of resin materials, it is possible to prevent the focal point from being deviated from the core 118 of the optical fiber 18.

Thus, in the optical connector 10 according to Embodiment 1, it is possible to reduce the insertion loss even at the time of high power light input.

In the optical connector 10 according to Embodiment 1, in the case in which the convex surfaces of the lenses 44 of the lens element 14 have antireflection coating, it is possible to reduce the reflection attenuation amount. In the case in which the convex surfaces of the lenses 44 have a multilayer antireflection coating, it is possible, for example, in the bandwidth of ±40 nm centered on 1310 nm, to make the reflection at the convex surface of the lens 44 −40 dB or less and to make the amount of the light reflected on the convex surface of the lens 44 and coupled to the optical fiber 18 −55 dB or less.

Note that in the optical connector 10 according to Embodiment 1, if the ferrule 12 and the lens element 14 have different linear expansion coefficients, a deviation occurs between the optical axis of each optical fiber 18 fixed to the ferrule 12 and the optical axis of the lens 44 due to temperature change, and thus, the temperature change may change the insertion loss of the light to the optical connector 10.

To address this, it is desirable in the optical connector 10 to select the materials of the ferrule 12 and the lens element 14 such that the difference between the linear expansion coefficients of the ferrule 12 and the lens element 14 will be small. For example, it is preferable to adjust (for example, reduce) the amount of the filler mixed (for example, quartz glass) in the base material of the ferrule 12 (for example, polyphenylene sulfide (PPS)) such that the difference between the linear expansion coefficients of the ferrule 12 and the lens element 14 will be 20 ppm/° C. or less.

In the optical connector 10, the ferrule 12 and the lens element 14 may be formed of the same material. For the above material, examples of resin materials include cycloolefin polymer (COP, the linear expansion coefficient: 60 to 80 ppm/° C.) and polyetherimide (PEI, the linear expansion coefficient: 56 ppm/° C.).

Embodiment 2

Figure 9:
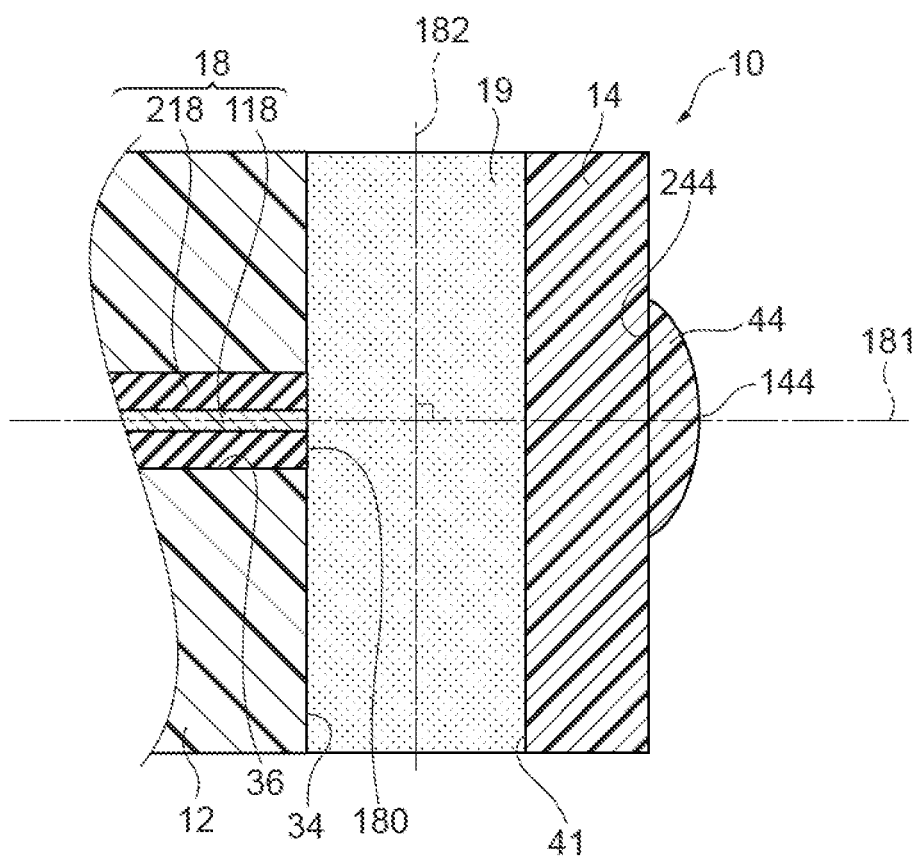
FIG. 9 is a diagram schematically illustrating the joint portion between an optical fiber and a lens element in an optical connector according to Embodiment 2.

FIG. 9 is a diagram schematically illustrating the joint portion between an optical fiber 18 and a lens element 14 in an optical connector 10 according to Embodiment 2. In FIG. 9, in the optical connector 10 for connecting multicore optical fibers of a single-mode by a lens method, the joint portion of an optical fiber 18, out of the structure of the portion at which the lens element 14 having a plurality of lenses 44 formed on its surface and the ferrule 12 holding a plurality of optical fibers 18 are joined, is representatively illustrated.

As illustrated in FIG. 9, the lens-array back face 41 is joined to the connection-side end face 34 of the ferrule 12 (the ferrule body portion 24) and the end face 180 of the optical fiber 18 via the adhesive 19. Note that, although not illustrated, the adhesive 19 is also put into the gap between the inner wall of the optical-fiber insertion hole 36 of the ferrule 12 and the optical fiber 18.

The joint surface between the optical fiber 18 and the lens element 14 is perpendicular to the optical axis 181 of each optical fiber 18. In other words, the joint surface between the optical fiber 18 and the lens element 14 is parallel to the plane 182 perpendicular to the optical axis 181 of the optical fiber 18.

Here, the joint surface between the optical fiber 18 and the lens element 14 means the end face 180 of the optical fiber 18 and the lens-array back face 41 joined to each other via the adhesive 19.

In other words, the end face 180 of the optical fiber 18 and the lens-array back face 41 are parallel to the plane 182 perpendicular to the optical axis 181 of the optical fiber 18 and joined via the adhesive 19 without being inclined. Note that the optical connector 10 according to Embodiment 2 illustrated in FIG. 9 has a structure similar to that of the optical connector 10 according to Embodiment 1 illustrated in FIG. 3 except that the optical fiber 18 and the lens element 14 each are not inclined.

Figure 10:
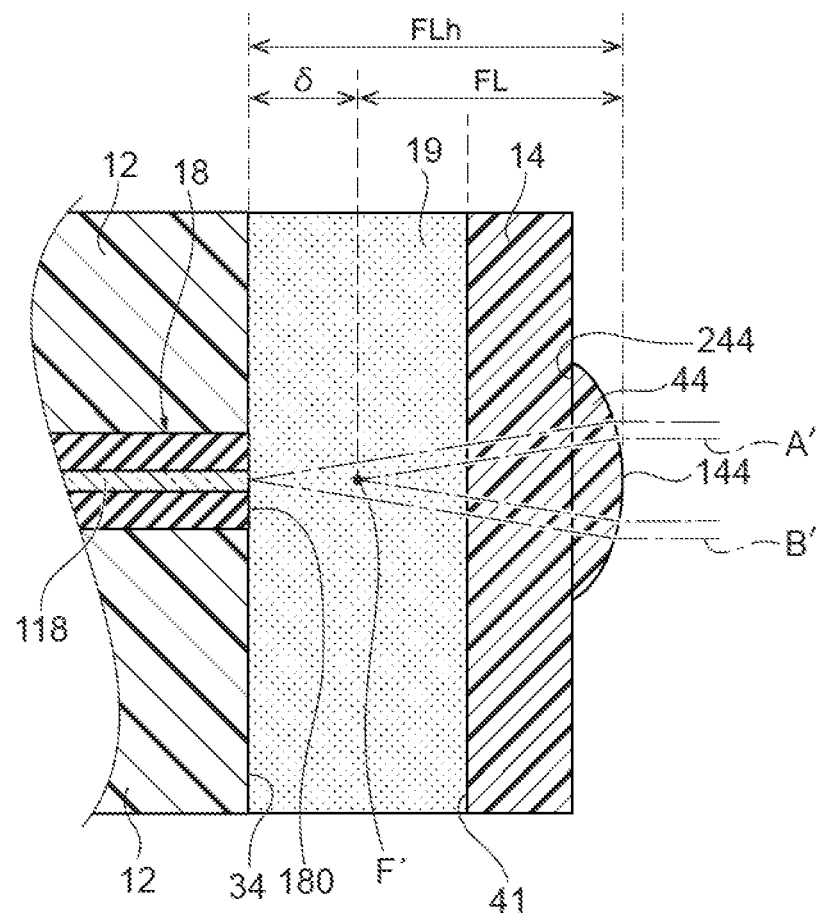
FIG. 10 is a diagram schematically illustrating the relation among the distance FLh, the distance FL, and the length δ in the optical connector according to Embodiment 2.

FIG. 10 is a diagram schematically illustrating the relation among the distance FLh between the end face of the optical fiber 18 and the vertex of the lens 44, the distance FL from the vertex of the lens 44 to the focal point F' positioned in the back face direction of the lens 44, and the length δ between the end face of the optical fiber 18 and the focal point F', in the optical connector 10 according to Embodiment 2. In FIG. 10, as in FIG. 7, as an example of an optical connector 10 for connecting multicore optical fibers of a single-mode by a lens method, one optical fiber 18 of the plurality of optical fibers 18 fixed to the ferrule 12 is representatively illustrated.

The distance FLh between the end face 180 of the optical fiber 18 and the vertex 144 of the lens is expressed by the sum of the distance FL from the vertex 144 of the lens to the focal point F' (the ideal focal point position F') positioned on the back face 244 side of the lens and the length δ between the end face 180 of the optical fiber 18 and the focal point F'.

The light incident through the vertex 144 of the lens at the time of low power light input is refracted via the lens 44 as indicated by the optical path A', further passes through the lens element 14, and reaches the ideal focal point position F'. The focal point F' is positioned between the lens-array back face 41 and the end face 180 of the optical fiber 18, in other words, within the adhesive 19.

At the time of high power light input, the light incident through the vertex 144 of the lens is refracted via the lens 44 as indicated by the optical path B', further passes through the lens element 14 and the adhesive 19, and reaches the end face 180 of the optical fiber 18. Specifically, the focal point at the time of high power light input is adjusted so as to be positioned at the core 118 of the optical fiber 18.

The length δ is the distance (length) between the ideal focal point position F' and the focal point position at the time of high power light input and is set longer than 10 μm. As described above, the distance FLh is adjusted such that the focal point at the time of high power light input will be at the position shifted from the ideal focal point position F' by the length δ, which is longer than 10 μm, toward the end face 180 of the optical fiber 18.

As above, also, in the optical connector 10 according to Embodiment 2, the distance FLh is adjusted such that the focal point at the time of high power light input will be at the position shifted from the ideal focal point position F' by the length δ, which is longer than 10 μm, toward the end face 180 of the optical fiber 18 (the core 118). Since the focal point at the time of high power light input is positioned at the end face 180 of the optical fiber 18 (the core 118), even though the lens element 14 and the lens 44 are formed of resin materials, it is possible to prevent the focal point from being deviated from the core 118 of the optical fiber 18.

Expansion of Embodiments

Although the disclosure made by the present inventors has been specifically described above based on the embodiments, the present disclosure is not limited to those embodiments, but various changes can be made within a scope not departing from the spirit.

For example, although in the above embodiments, examples of cases are shown in which the ferrule 12 is formed as a part separate from the lens element 14, the ferrule 12 may be integrally formed with the lens element 14.

Although in the above embodiments, examples of cases are shown in which the number of optical fibers 18 is plural, the disclosure is not limited to these examples, but a single optical fiber may be used. The optical fibers 18 may be ones included in a cable, a cord, or the like.

Although in the above embodiments, examples of cases are shown in which the optical fiber 18 is an optical fiber of a single-mode (SM), but the optical fiber 18 may be an optical fiber of a multi-mode (MM). In the case in which the optical fiber 18 is an optical fiber of a multi-mode (MM), the wavelengths of the wavelength bandwidths of 850 nm (in the range of 850 nm±50 nm), 1060 nm (in the range of 1060 nm±50 nm), and 1310 nm (in the range of 1310 nm±50 nm) are used.

Although in the above embodiments, examples of cases are shown in which the optical connector 10 is a male connector including the guide pins 16, the optical connector 10 may be a female connector without guide pins 16. The optical connector 10 may be a multi-fiber push on (MPO) connector in which guide pins 16 are integrated in the housing such as the adapter.

The optical connector 10 in each of the above embodiments may be used as an optical connector connection structure, and in such an optical connector connection structure, at least one of the connectors to be mated may be the optical connector 10.

What is claimed is:

1. An optical connector comprising:
at least one optical fiber;
a lens element including at least one lens that couples light to an end face of the optical fiber;
a ferrule holding the optical fiber; and
an adhesive filled between the ferrule and the lens element, wherein
a distance FLh (μm) between an end face of the optical fiber and a vertex of the lens is expressed by a sum of a distance FL (μm) from the vertex of the lens to a focal point F positioned in a back face direction of the lens and a length δ (μm) between the end face of the optical fiber and the focal point F,
the length δ is longer than 10 μm,
the back face of the lens is fixed to the end face of the optical fiber via an adhesive,
a connection loss during high power light input is smaller than a connection loss during low power light input,
the high power is an incoming optical power of +20 dBm or more,
the low power is an incoming optical power less than +11 dBm,
the optical fiber is a single-mode fiber.

2. The optical connector according to claim 1, wherein the lens element includes a resin material.

3. The optical connector according to claim 1, wherein the lens element and the ferrule include the same resin material.

4. The optical connector according to claim 2, wherein the resin material is cycloolefin polymer or polyetherimide.

5. The optical connector according to claim 1, comprising a filling medium between the end face of the optical fiber and the lens element, wherein
the filling medium is an adhesive.

6. The optical connector according to claim 1, wherein the at least one optical fiber is a plurality of optical fibers, and
the at least one lens is a plurality of lenses corresponding to the optical fibers.

7. The optical connector according to claim 1, wherein the length δ is longer than 20 μm.

8. The optical connector according to claim 1, wherein the length δ is 100 μm or less.

9. An optical connector connection structure, wherein at least one of optical connectors to be mated includes the optical connector according to claim 1.

10. The optical connector according to claim 1, wherein a difference between linear expansion coefficients of the ferrule and the lens element is 20 ppm/° C. or less.

* * * * *